(12) United States Patent  
Tiirola et al.

(10) Patent No.: US 10,932,237 B2  
(45) Date of Patent: Feb. 23, 2021

(54) PUCCH RESOURCE ALLOCATION

(71) Applicant: Nokia Technologies Oy, Espoo (FI)

(72) Inventors: Esa Tiirola, Kempele (FI); Sami-Jukka Hakola, Kempele (FI); Kari Pajukoski, Oulu (FI); Eeva Lahetkangas, Kiiminki (FI)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 16/075,710

(22) PCT Filed: Feb. 8, 2017

(86) PCT No.: PCT/FI2017/050070  
§ 371 (c)(1),  
(2) Date: Aug. 6, 2018

(87) PCT Pub. No.: WO2017/149194  
PCT Pub. Date: Sep. 8, 2017

(65) Prior Publication Data  
US 2019/0053219 A1 Feb. 14, 2019

Related U.S. Application Data

(60) Provisional application No. 62/301,867, filed on Mar. 1, 2016.

(51) Int. Cl.  
*H04W 72/04* (2009.01)  
*H04L 5/00* (2006.01)  
(Continued)

(52) U.S. Cl.  
CPC ....... *H04W 72/0413* (2013.01); *H04L 1/1854* (2013.01); *H04L 1/1861* (2013.01);  
(Continued)

(58) Field of Classification Search  
CPC ............. H04W 72/0413; H04L 1/1671; H04L 1/1822; H04L 1/18  
See application file for complete search history.

(56) References Cited

U.S. PATENT DOCUMENTS

| 2011/0268048 A1 | 11/2011 | Toskala et al. | 370/329 |
| 2012/0213170 A1 | 8/2012 | Choi et al. | 370/329 |

(Continued)

FOREIGN PATENT DOCUMENTS

| JP | 2001/524269 A | 11/2001 |
| JP | 2014/509139 A | 4/2014 |

(Continued)

OTHER PUBLICATIONS

Sesia, Stefania, et al., "LTE—The UMTS Long Term Evolution: From Theory to Practice", Chapter 6, 2009.

(Continued)

*Primary Examiner* — Siming Liu  
(74) *Attorney, Agent, or Firm* — Harrington & Smith

(57) ABSTRACT

In a first subframe, data is sent by a network node in a DL shared channel and a timing indicator is sent in a PDCCH to UE, the timing indicator indicating an offset relative to the first subframe the UE should use in order to determine a second subframe to use to send, in a PUCCH, acknowledgement information for the data received in the DL shared channel of the first subframe. The acknowledgement information is received by the network node from the UE in the PUCCH of the second subframe. The UE receives the data and timing indicator and determines the second subframe using at least the timing indicator. The UE transmits the acknowledgement information in the PUCCH of the second subframe. Apparatus, computer programs and products, and methods are disclosed.

18 Claims, 7 Drawing Sheets

(51) Int. Cl.
*H04L 1/18* (2006.01)
*H04B 7/06* (2006.01)

(52) U.S. Cl.
CPC .......... *H04L 5/0023* (2013.01); *H04L 5/0053* (2013.01); *H04L 5/0055* (2013.01); *H04B 7/0617* (2013.01); *H04L 1/1812* (2013.01); *H04L 1/1822* (2013.01)

(56) References Cited

U.S. PATENT DOCUMENTS

| | | | | |
|---|---|---|---|---|
| 2014/0056278 | A1* | 2/2014 | Marinier | H04W 72/044 370/330 |
| 2014/0126491 | A1 | 5/2014 | Ekpenyong et al. | 370/329 |
| 2015/0092624 | A1 | 4/2015 | Yao et al. | 370/278 |
| 2015/0092757 | A1 | 4/2015 | Tiirola et al. | 370/336 |
| 2015/0124671 | A1* | 5/2015 | Tabet | H04W 52/0216 370/311 |
| 2015/0131564 | A1 | 5/2015 | Seo et al. | |
| 2016/0072617 | A1 | 3/2016 | Nagata et al. | |
| 2017/0171866 | A1* | 6/2017 | Cheng | H04W 72/0426 |

FOREIGN PATENT DOCUMENTS

| | | |
|---|---|---|
| JP | 2014/207560 A | 10/2014 |
| JP | 2015/531220 A | 10/2015 |
| WO | WO-98/15084 A1 | 4/1998 |
| WO | WO-2014/031998 A1 | 2/2014 |
| WO | WO 2014/032724 A1 | 3/2014 |

OTHER PUBLICATIONS

"3$^{rd}$ Generation Partnership Project; Technical Specification Group Radio Access Network; Evolved Universal Terrestrial Radio Access (E-UTRA); Physical channels and modulation (Release 11)", 3GPP TS 36.211 V11.4.0, Chapters 10-12, Sep. 2013, 102 pages.

"3$^{rd}$ Generation Partnership Project; Technical Specification Group Radio Access Network; Evolved Universal Terrestrial Radio Access (E-UTRA); Physical layer procedures (Release 12)", 3GPP TS 36.213 V12.8.0, Chapter 5 and 6, Dec. 2015, 54 pages.

* cited by examiner

| UL-DL Configuration | Subframe n | | | | | | | | | |
|---|---|---|---|---|---|---|---|---|---|---|
| | 0 | 1 | 2 | 3 | 4 | 5 | 6 | 7 | 8 | 9 |
| 0 | - | - | 6 | - | 4 | - | - | 6 | - | 4 |
| 1 | - | - | 7, 6 | 4 | - | - | - | 7, 6 | 4 | - |
| 2 | - | - | 8, 7, 4, 6 | - | - | - | - | 8, 7, 4, 6 | - | - |
| 3 | - | - | 7, 6, 11 | 6, 5 | 5, 4 | - | - | - | - | - |
| 4 | - | - | 12, 8, 7, 11 | 6, 5, 4, 7 | - | - | - | - | - | - |
| 5 | - | - | 13, 12, 9, 8, 7, 5, 4, 11, 6 | - | - | - | - | - | - | - |
| 6 | - | - | 7 | 7 | 5 | - | - | 7 | 7 | - |

PUCCH RESOURCE ALLOCATION

This patent application is a U.S. National Stage application of International Patent Application Number PCT/FI2017/050070 filed Feb. 8, 2017, which claims priority to U.S. provisional application 62/301,867 which are hereby incorporated by reference in their entireties.

TECHNICAL FIELD

This invention relates generally to control channels in wireless networks and, more specifically, relates to PUCCH (physical uplink control channel) resource allocation.

BACKGROUND

This section is intended to provide a background or context to the invention disclosed below. The description herein may include concepts that could be pursued, but are not necessarily ones that have been previously conceived, implemented or described. Therefore, unless otherwise explicitly indicated herein, what is described in this section is not prior art to the description in this application and is not admitted to be prior art by inclusion in this section. Abbreviations that may be found in the specification and/or the drawing figures are defined below, after the main part of the detailed description section.

Standards for wireless communication of data for mobile stations and similar wireless devices (commonly referred to as user equipment) have progressed through a number of generations. The current generation is called 4G LTE, and the generation being developed and implemented now is commonly referred to as 5G. The designs for 5G use a number of techniques to improve data rates over 4G.

For instance, massive MIMO based on RF beamforming is one of the key enablers in facilitating cost efficient Gb/s and for communications at higher frequency bands (such as cmWave, mmWave). It may for example enable high beamforming gain with a reasonable amount of digital processing at the transmitter and/or receiver side. RF beamforming is a technique where transmission from a base station or other RF transmitter is "beamed" toward a receiver, e.g., on a mobile station.

In order to support these improved techniques and faster data rates, an uplink control information (UCI) arrangement contributes to many 5G KPIs such as latency, spectrum efficiency (e.g., through system overhead), and the number of simultaneous UEs supported with certain implementations. Specifically, the PUCCH, which carries UL control information such as HARQ-ACK and/or CSI via UL channel(s), should support the improvements being made for 5G.

BRIEF SUMMARY

This section is intended to include examples and is not intended to be limiting.

In an exemplary embodiment, a method comprises sending, by a network node and in a first subframe, data in a downlink shared channel and a timing indicator in a physical downlink control channel to user equipment. The timing indicator indicates an offset relative to the first subframe the user equipment should use in order to determine a second subframe to use to send, in a physical uplink control channel, acknowledgement information for the data received in the downlink shared channel of the first subframe. The method comprises receiving by the network node the acknowledgement information from the user equipment in the physical uplink control channel of the second subframe.

An additional example of an embodiment includes a computer program, comprising code for performing the method of the previous paragraph, when the computer program is run on a processor. The computer program according to this paragraph, wherein the computer program is a computer program product comprising a computer-readable medium bearing computer program code embodied therein for use with a computer.

An example of an apparatus includes one or more processors and one or more memories including computer program code. The one or more memories and the computer program code are configured to, with the one or more processors, cause the apparatus to perform at least the following: sending, by a network node and in a first subframe, data in a downlink shared channel and a timing indicator in a physical downlink control channel to user equipment, the timing indicator indicating an offset relative to the first subframe the user equipment should use in order to determine a second subframe to use to send, in a physical uplink control channel, acknowledgement information for the data received in the downlink shared channel of the first subframe; and receiving by the network node the acknowledgement information from the user equipment in the physical uplink control channel of the second subframe.

An example of a computer program product includes a computer-readable storage medium bearing computer program code embodied therein for use with a computer. The computer program code includes: code for sending, by a network node and in a first subframe, data in a downlink shared channel and a timing indicator in a physical downlink control channel to user equipment, the timing indicator indicating an offset relative to the first subframe the user equipment should use in order to determine a second subframe to use to send, in a physical uplink control channel, acknowledgement information for the data received in the downlink shared channel of the first subframe; and code for receiving by the network node the acknowledgement information from the user equipment in the physical uplink control channel of the second subframe.

In another example of an embodiment, an apparatus comprises: means for sending, by a network node and in a first subframe, data in a downlink shared channel and a timing indicator in a physical downlink control channel to user equipment, the timing indicator indicating an offset relative to the first subframe the user equipment should use in order to determine a second subframe to use to send, in a physical uplink control channel, acknowledgement information for the data received in the downlink shared channel of the first subframe; and means for receiving by the network node the acknowledgement information from the user equipment in the physical uplink control channel of the second subframe.

In an additional exemplary embodiment, a method comprises receiving, at a user equipment and in a first subframe, data in a downlink shared channel and a timing indicator in a physical downlink control channel from a network node. The timing indicator indicates an offset relative to the first subframe the user equipment should use in order to determine a second subframe to use to send, in a physical uplink control channel, acknowledgement information for the data received in the first subframe. The method comprises determining by the user equipment the second subframe using at least the timing indicator, and transmitting, by the user equipment and to the network node, the acknowledgement information in the physical uplink control channel of the second subframe.

An additional example of an embodiment includes a computer program, comprising code for performing the method of the previous paragraph, when the computer program is run on a processor. The computer program according to this paragraph, wherein the computer program is a computer program product comprising a computer-readable medium bearing computer program code embodied therein for use with a computer.

An example of an apparatus includes one or more processors and one or more memories including computer program code. The one or more memories and the computer program code are configured to, with the one or more processors, cause the apparatus to perform at least the following: receiving, at a user equipment and in a first subframe, data in a downlink shared channel and a timing indicator in a physical downlink control channel from a network node, the timing indicator indicating an offset relative to the first subframe the user equipment should use in order to determine a second subframe to use to send, in a physical uplink control channel, acknowledgement information for the data received in the first subframe; determining by the user equipment the second subframe using at least the timing indicator; and transmitting, by the user equipment and to the network node, the acknowledgement information in the physical uplink control channel of the second subframe.

An example of a computer program product includes a computer-readable storage medium bearing computer program code embodied therein for use with a computer. The computer program code includes: code for receiving, at a user equipment and in a first subframe, data in a downlink shared channel and a timing indicator in a physical downlink control channel from a network node, the timing indicator indicating an offset relative to the first subframe the user equipment should use in order to determine a second subframe to use to send, in a physical uplink control channel, acknowledgement information for the data received in the first subframe; code for determining by the user equipment the second subframe using at least the timing indicator; and code for transmitting, by the user equipment and to the network node, the acknowledgement information in the physical uplink control channel of the second subframe.

In another example of an embodiment, an apparatus comprises: means for receiving, at a user equipment and in a first subframe, data in a downlink shared channel and a timing indicator in a physical downlink control channel from a network node, the timing indicator indicating an offset relative to the first subframe the user equipment should use in order to determine a second subframe to use to send, in a physical uplink control channel, acknowledgement information for the data received in the first subframe; means for determining by the user equipment the second subframe using at least the timing indicator; and means for transmitting, by the user equipment and to the network node, the acknowledgement information in the physical uplink control channel of the second subframe.

BRIEF DESCRIPTION OF THE DRAWINGS

In the attached Drawing Figures:

FIGS. 2a, 2b, and 2c, shows different possible scenarios for xPUCCH;

DETAILED DESCRIPTION OF THE DRAWINGS

The word "exemplary" is used herein to mean "serving as an example, instance, or illustration." Any embodiment described herein as "exemplary" is not necessarily to be construed as preferred or advantageous over other embodiments. All of the embodiments described in this Detailed Description are exemplary embodiments provided to enable persons skilled in the art to make or use the invention and not to limit the scope of the invention which is defined by the claims.

For ease of reference, the instant disclosure is divided into a number of sections. First, an introduction is provided, and then detailed description for some examples is presented.

Introduction: Example Possible System

The exemplary embodiments herein describe techniques for PUCCH resource allocation, with particular emphasis placed on xPUCCH resource allocation for hybrid beamforming architecture. It is noted that the acronym "xPUCCH" is used herein to differentiate from LTE/4G PUCCH, but the techniques presented herein are not limited to a particular PUCCH. Additional description of these techniques and additional introduction is presented after a system into which the exemplary embodiments may be used is described.

Figure 1:
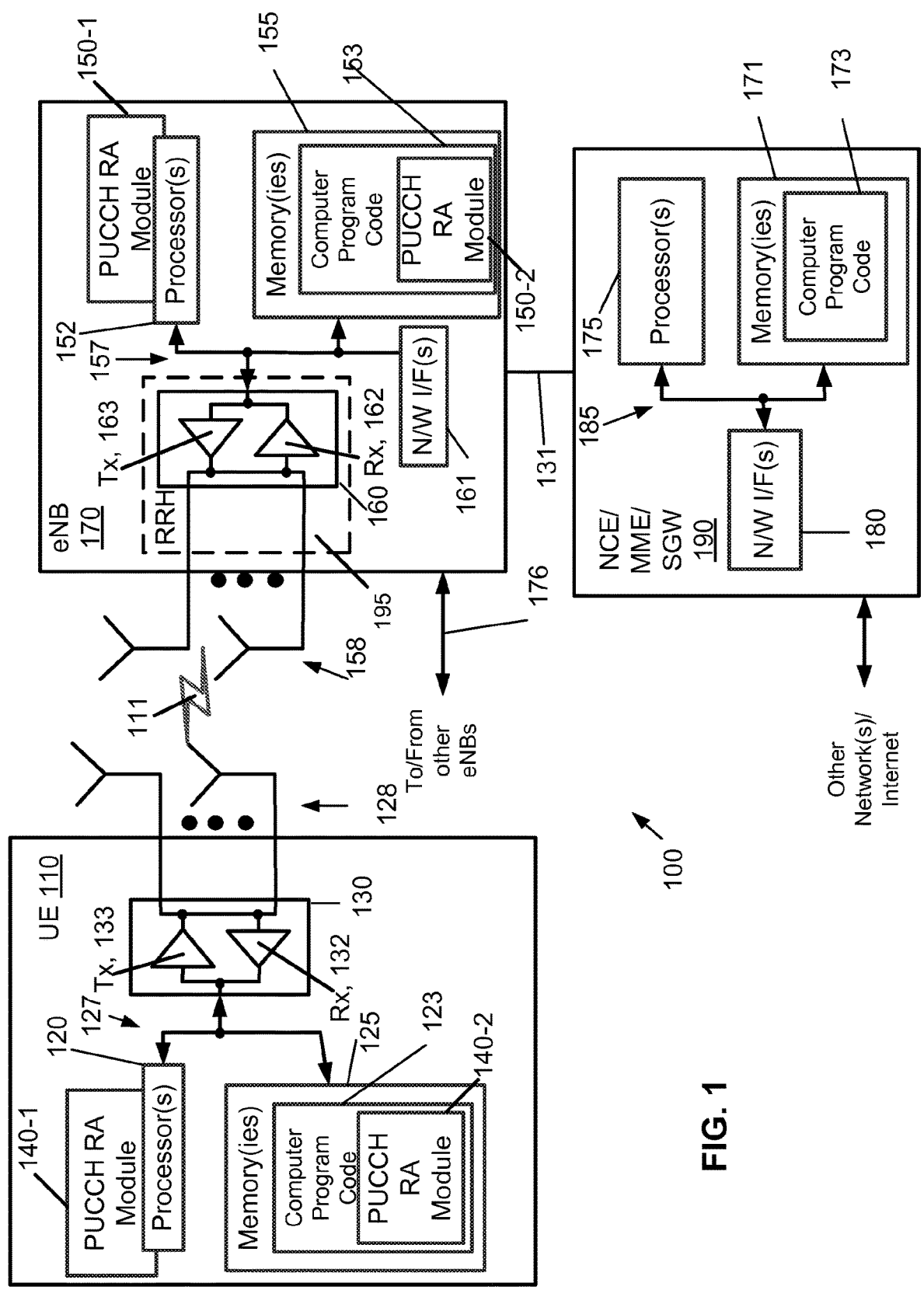
FIG. 1 is a block diagram of one possible and non-limiting exemplary system in which the exemplary embodiments may be practiced.

Turning to FIG. 1, this figure shows a block diagram of one possible and non-limiting exemplary system in which the exemplary embodiments may be practiced. In FIG. 1, a user equipment (UE) 110 is in wireless communication with a wireless network 100. A UE is a wireless, typically mobile device that can access a wireless network. The UE 110 includes one or more processors 120, one or more memories 125, and one or more transceivers 130 interconnected through one or more buses 127. Each of the one or more transceivers 130 includes a receiver, Rx, 132 and a transmitter, Tx, 133. The one or more buses 127 may be address, data, or control buses, and may include any interconnection mechanism, such as a series of lines on a motherboard or integrated circuit, fiber optics or other optical communication equipment, and the like. The one or more transceivers 130 are connected to one or more antennas 128. The one or more memories 125 include computer program code 123. The UE 110 includes a PUCCH RA module 140, comprising one of or both parts 140-1 and/or 140-2, which may be implemented in a number of ways. The PUCCH RA module 140 may be implemented in hardware as PUCCH RA module 140-1, such as being implemented as part of the one or more processors 120. The PUCCH RA module 140-1 may be implemented also as an integrated circuit or through other hardware such as a programmable gate array. In another example, the PUCCH RA module 140 may be implemented as PUCCH RA module 140-2, which is implemented as computer program code 123 and is executed by the one or more processors 120. For instance, the one or more memories 125 and the computer program code 123 may be configured to, with the one or more processors 120, cause the user equipment 110 to perform one or more of the operations as described herein. The UE 110 communicates with eNB 170 via a wireless link 111.

The eNB (evolved NodeB) 170 is a base station (e.g., for LTE, long term evolution) that provides access by wireless devices such as the UE 110 to the wireless network 100. The eNB 170 includes one or more processors 152, one or more memories 155, one or more network interfaces (N/W I/F(s)) 161, and one or more transceivers 160 interconnected through one or more buses 157. Each of the one or more transceivers 160 includes a receiver, Rx, 162 and a transmitter, Tx, 163. The one or more transceivers 160 are connected to one or more antennas 158. The one or more memories 155 include computer program code 153. The eNB 170 includes a PUCCH RA module 150, comprising one of or both parts 150-1 and/or 150-2, which may be implemented in a number of ways. The PUCCH RA module 150 may be implemented in hardware as PUCCH RA module 150-1, such as being implemented as part of the one or more processors 152. The PUCCH RA module 150-1 may be implemented also as an integrated circuit or through other hardware such as a programmable gate array. In another example, the PUCCH RA module 150 may be implemented as PUCCH RA module 150-2, which is implemented as computer program code 153 and is executed by the one or more processors 152. For instance, the one or more memories 155 and the computer program code 153 are configured to, with the one or more processors 152, cause the eNB 170 to perform one or more of the operations as described herein. The one or more network interfaces 161 communicate over a network such as via the links 176 and 131. Two or more eNBs 170 communicate using, e.g., link 176. The link 176 may be wired or wireless or both and may implement, e.g., an X2 interface.

The one or more buses 157 may be address, data, or control buses, and may include any interconnection mechanism, such as a series of lines on a motherboard or integrated circuit, fiber optics or other optical communication equipment, wireless channels, and the like. For example, the one or more transceivers 160 may be implemented as a remote radio head (RRH) 195, with the other elements of the eNB 170 being physically in a different location from the RRH, and the one or more buses 157 could be implemented in part as fiber optic cable to connect the other elements of the eNB 170 to the RRH 195. The RRH 195 and/or the eNB 170 can be network nodes that provide wireless communication with UE(s) 110.

The wireless network 100 may include a network control element (NCE) 190 that may include MME (Mobility Management Entity)/SGW (Serving Gateway) functionality, and which provides connectivity with a further network, such as a telephone network and/or a data communications network (e.g., the Internet). The eNB 170 is coupled via a link 131 to the NCE 190. The link 131 may be implemented as, e.g., an S1 interface. The NCE 190 includes one or more processors 175, one or more memories 171, and one or more network interfaces (N/W I/F(s)) 180, interconnected through one or more buses 185. The one or more memories 171 include computer program code 173. The one or more memories 171 and the computer program code 173 are configured to, with the one or more processors 175, cause the NCE 190 to perform one or more operations.

The wireless network 100 may implement network virtualization, which is the process of combining hardware and software network resources and network functionality into a single, software-based administrative entity, a virtual network. Network virtualization involves platform virtualization, often combined with resource virtualization. Network virtualization is categorized as either external, combining many networks, or parts of networks, into a virtual unit, or internal, providing network-like functionality to software containers on a single system. Note that the virtualized entities that result from the network virtualization are still implemented, at some level, using hardware such as processors 152 or 175 and memories 155 and 171, and also such virtualized entities create technical effects.

The computer readable memories 125, 155, and 171 may be of any type suitable to the local technical environment and may be implemented using any suitable data storage technology, such as semiconductor based memory devices, flash memory, magnetic memory devices and systems, optical memory devices and systems, fixed memory and removable memory. The computer readable memories 125, 155, and 171 may be means for performing storage functions. The processors 120, 152, and 175 may be of any type suitable to the local technical environment, and may include one or more of general purpose computers, special purpose computers, microprocessors, digital signal processors (DSPs) and processors based on a multi-core processor architecture, as non-limiting examples. The processors 120, 152, and 175 may be means for performing functions, such as controlling the UE 110, eNB 170, and other functions as described herein.

In general, the various embodiments of the user equipment 110 can include, but are not limited to, cellular telephones such as smart phones, tablets, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, tablets with wireless communication capabilities, as well as portable units or terminals that incorporate combinations of such functions.

Having thus introduced one suitable but non-limiting technical context for the practice of the exemplary embodiments of this invention, additional introduction is provided.

Introduction: Hybrid Transceiver Architecture and Corresponding PUCCH

Wireless communications at higher frequency bands (such as cmWave, mmWave) is typically based on TDD (Time Division Duplexing) half-duplex technology, where a node can either transmit or receive on a certain frequency band at a time. Typical operation mode when using a hybrid transceiver architecture is beam-based operation, where a BS (such as eNB 170) can either transmit to or receive from certain spatial directions at a time. That is, only a portion of the sector's or cell's spatial/angular domain can be captured at one time by a beam or multiple beams. The number of parallel beams is determined by the number of baseband antenna ports (which are logical entities that can be uniquely distinguished by a receiver) and the number of RF chains (transceiver units). The following may be design parameters for a specific BS implementation. For instance, a BS may have 8 antenna ports and an antenna array (as antennas 158) comprising four dual polarized antenna panels. Two antenna ports are connected to each panel. In typical operation, RF beams generated by one panel (two polarization beams) would be directed always to the same direction, providing means to transmit to four different directions at a time. The same would apply for reception as well. That configuration would always provide at least a transmit diversity and a receive diversity degree of two, respectively.

With such a hybrid transceiver architecture, multiplexing capacity is determined primarily by the number of parallel beams and beam width of the beams. To achieve high antenna gain, beams may be very narrow and thus only a limited number of UEs 110 may be served by one beam at a time, in some cases only a single UE 110 might be served. Thus, to provide xPDSCH HARQ-ACK resources for a high number of UEs distributed within the angular domain of the sector time domain multiplexing (that is, within each beam) is an important consideration.

Figure 2:
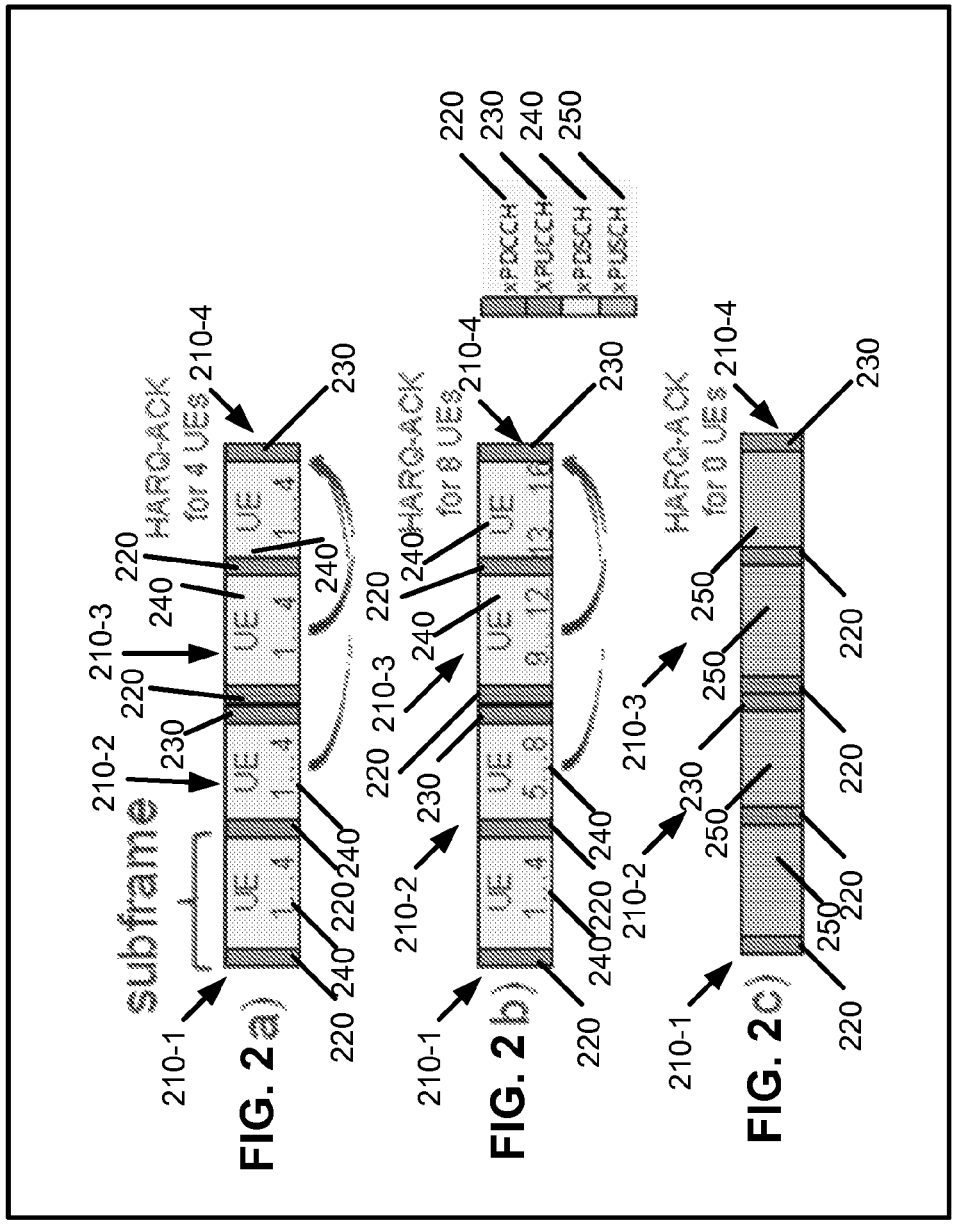
FIG. 2, which includes

On the other hand, the number of UEs transmitting xPDSCH HARQ-ACK via xPUCCH varies a lot depending on the eNB 170 scheduler decisions. This is illustrated in FIG. 2, which shows FIGS. 2a, 2b, and 2c, described below. Each figure in FIG. 2 has four subframes 210-1 through 210-4, and the xPDCCH 220, xPUCCH 230, xPDSCH 240, and xPUSCH 250 are shown. The "x" is used to distinguish the channel from the corresponding LTE/4G channel. As is known, a subframe such as subframes 210 are two-dimensional resource spaces with OFDM symbols (in time, shown as the horizontal axis in the figures) and multiple subcarriers (in frequency, shown as the vertical axis in the figures). It should be noted that the current example assumes time division multiplexing between different channels, e.g. between xPUCCH and xPUSCH. It is equally possible to consider also different multiplexing solutions between different channels, e.g. frequency division multiplexing, and/or code division multiplexing, and/or spatial domain multiplexing. FIG. 2 illustrates the following:

The scenario in FIG. 2a illustrates PDSCH HARQ-ACK for 4 simultaneous UEs, where the xPUCCH 230 in subframe 210-4 contains HARQ-ACK information for 4 UEs receiving information over PDSCH 240 in subframes 210-2 and 210-3;

The scenario in FIG. 2b illustrates PDSCH HARQ-ACK for 8 simultaneous UEs, where the xPUCCH 230 in subframe 210-4 contains HARQ-ACK information for 8 UEs receiving information over PDSCH 240 in subframes 210-2 and 210-3; and The scenario in FIG. 2c illustrates PDSCH HARQ-ACK for 0 (zero) simultaneous UEs, where there are no PDSCH 240 in the subframes 210 and instead the subframes contain PUSCH 250.

As shown by FIG. 2, xPUCCH 230 needs to be scalable, e.g., to balance xPUCCH overhead and capacity/coverage. For that reason, a subframe may need to contain a variable number of xPUCCH symbols (e.g., OFDM symbols). On the other hand, each xPUCCH resource needs to be scalable in terms of number of resource elements/subcarriers allocated. This allows variable xPUCCH payload and also an adjustable amount of processing gain (which is beneficial in the interference limited scenario). Furthermore, certain UL beams may have good spatial separation with respect to each other, which may allow usage of the same xPUCCH resource elements for multiple UEs/beams during the same xPUCCH symbol (this can be seen as a form of multi-user MIMO for xPUCCH). Finally, it is up to the eNB 170 to define how to share the available receiver Rx beams between UEs transmitting xPUCCH 230. For example, the eNB 170 may allocate only one beam for UEs located close to the base station, and two or more beams for UEs located at the cell edge.

Based on this, the inventors believe that xPUCCH resources should scale in time, frequency and "space". Two issues considered herein concern the capabilities of hybrid beamforming architecture, which are limited by eNB implementation, and how to allocate xPUCCH resources.

Concerning the capabilities of hybrid beamforming architecture, these are limited by eNB implementation. Consider the following. A narrow RF beam can serve just one direction at a time. Hence, each UE requires typically dedicated beam resources. For instance, xPUCCH multiplexing capacity/symbol is limited by the number of receiver RF beams. Additionally, in order to provide sufficient performance for xPUCCH, it makes sense to allocate at least two (e.g., X-pol) receiver RF beams towards one UE that is transmitting xPUCCH. In practice (at least from the xPUCCH dimensioning point of view), the number of UEs/symbol is equal to the number of receiver RF beams divided by two. The number of receiver RF beams available at an eNB 170 depends on the implementation. On the other hand, the number of UEs 170 transmitting xPDSCH HARQ-ACK via xPUCCH 230 varies depending on the eNB scheduler decisions. To summarize, the UL control plane may be one of the bottlenecks of hybrid beamforming architecture.

Concerning how to allocate xPUCCH resources, these resources should be allocated such that xPUCCH overhead and HARQ-ACK feedback latency can be traded off in a flexible manner and xPUCCH resource allocation overhead can be minimized, while maintaining the following: scalable resource size in terms of REs/channel; scalable multi-user MIMO pairing among different Rx beams; scalable resource size number of xPUCCH symbols/cell; scalable payload/channel; and/or scalable number of Rx beams at the receiver.

How to address these issues is described below, after some additional introductory material.

Introduction: HARQ-ACK Timing in LTE TDD

Current systems (including UCI subsystems) are defined for digital architecture. They utilize fixed HARQ-ACK timing between xPDSCH 220 and xPUCCH 230. An example of such system is LTE TDD discussed below.

Figures 3, 4:
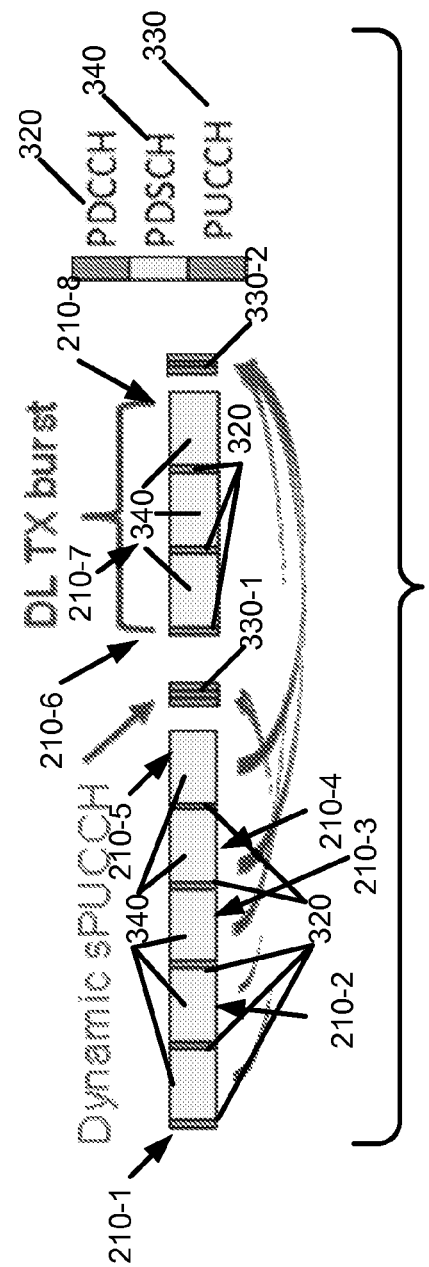
FIG. 3 is a table showing downlink association set index K: $\{k_0, k_1, \ldots k_{M-1}\}$ for LTE TDD, see, e.g., Table 10.1.3.1-1 of 3GPP TS 36.213 V12.8.0 (2015 December)
FIG. 4 illustrates PUCCH and corresponding HARQ-ACK feedback in a Multefire scenario.

When considering a HARQ-ACK feedback arrangement in LTE, it is helpful to understand the concept of downlink association set depicted in the table shown in FIG. 3. See also, e.g., Table 10.1.3.1-1 of 3GPP TS 36.213 V12.8.0 (2015 December). The DL association set in FIG. 3 defines for each UL subframe n the timing and the order in which the HARQ feedback for each DL/Special subframe is transmitted. That is, with UL-DL configuration #0, in UL subframe #n=2 the PUCCH may carry the HARQ-ACK for DL subframe which was 6 subframes earlier, i.e., the HARQ delay in this case is 6 subframes. Similarly, for UL-DL configuration 1, in UL subframe #2 the HARQ-ACK may be signaled for DL subframes that were 7 and/or 6 subframes earlier, and the PUCCH resources are filled in this specific order (first HARQ-ACK for DL subframe n-7, then for DL subframe n-6). In other words, the table in FIG. 3 illustrates the HARQ-ACK feedback delay (in terms of milliseconds) associated with each DL subframe. As can be seen, the delay ranges from 4 ms up to 13 ms.

Some implementations with scalable HARQ-ACK timing have been discussed in the context of Multefire (LTE standalone operation on unlicensed band). In a MulteFire Alliance scenario, HARQ-ACK feedback is based mainly on short PUCCH located right after the DL Tx burst (see FIG. 4). In FIG. 4, there are subframes 210-1 through 210-5 in one DL Tx burst, and another DL Tx burst that also comprises three subframes 210-6 through 210-8. The HARQ-ACK information for PDSCH 340 on subframes 210-1 and 210-2 is reported on the dynamic sPUCCH 330-1, and the HARQ-ACK information for PDSCH 340 on subframes 210-3 through 210-5 is reported on the dynamic sPUCCH 330-2. The PDCCH 320 is also shown as part of each of the subframes 210.

Another option for a HARQ-ACK feedback arrangement is to use so called ePUCCH triggered by the eNB. The motivation of ePUCCH is to provide an opportunity for the eNB to poll pending HARQ-ACKs, e.g., due to the fact that negative LBT may have prevented certain UEs from send HARQ-ACK via regular sPUCCH.

Example Implementation Overview

In the following, a flexible xPUCCH resource allocation scheme is proposed. Exemplary proposed allocation schemes cover subframe allocation for xPUCCH and resource allocation within a xPUCCH subframe. Subframe allocation and resource allocation for xPUCCH may be expressed, e.g., as one or more information elements in a DL grant.

Example Implementation Overview: Subframe Allocation for xPUCCH

Figure 5:
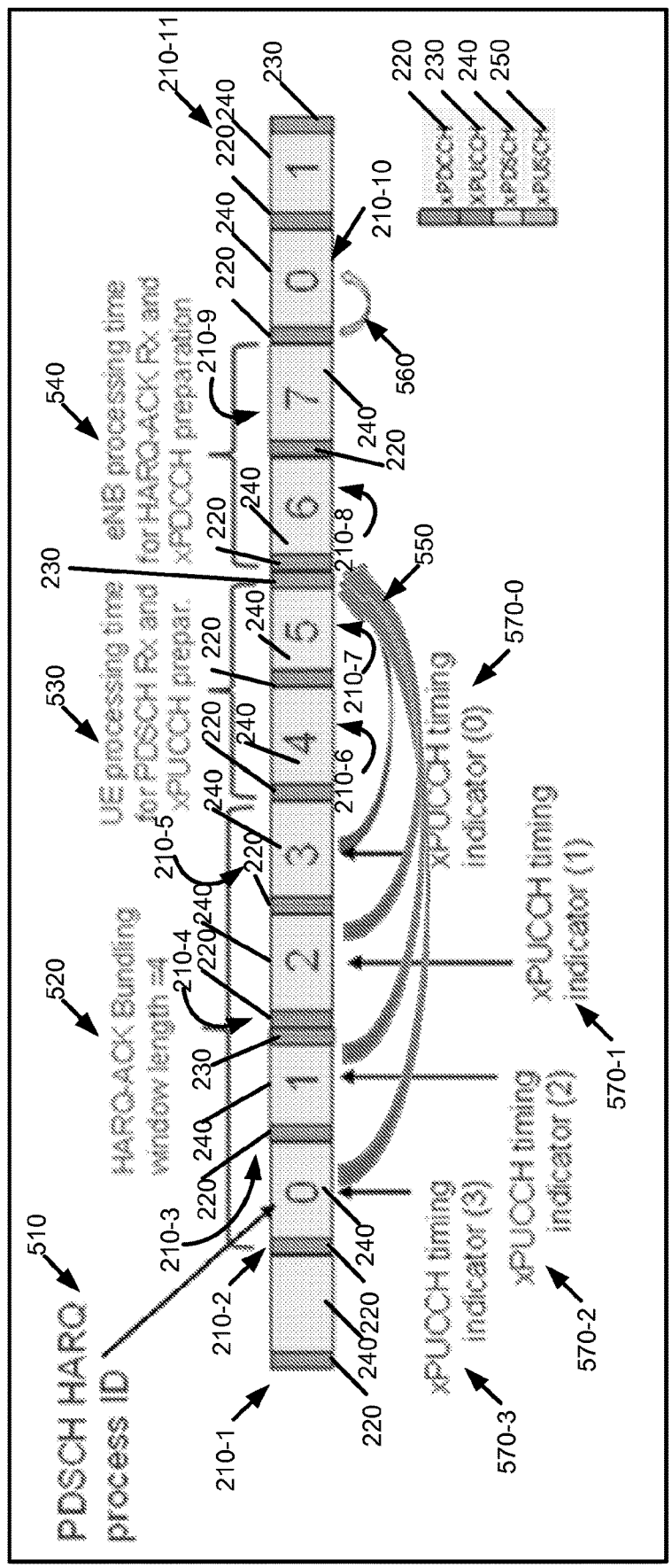
FIG. 5 illustrates resource optimized allocation (UE/eNB processing time is assumed to be about two subframes), where the larger arrows correspond to xPUCCH scheduling using xPDCCH and the smaller arrow corresponds to xPDSCH scheduling using xPDCCH.
Figure 6:
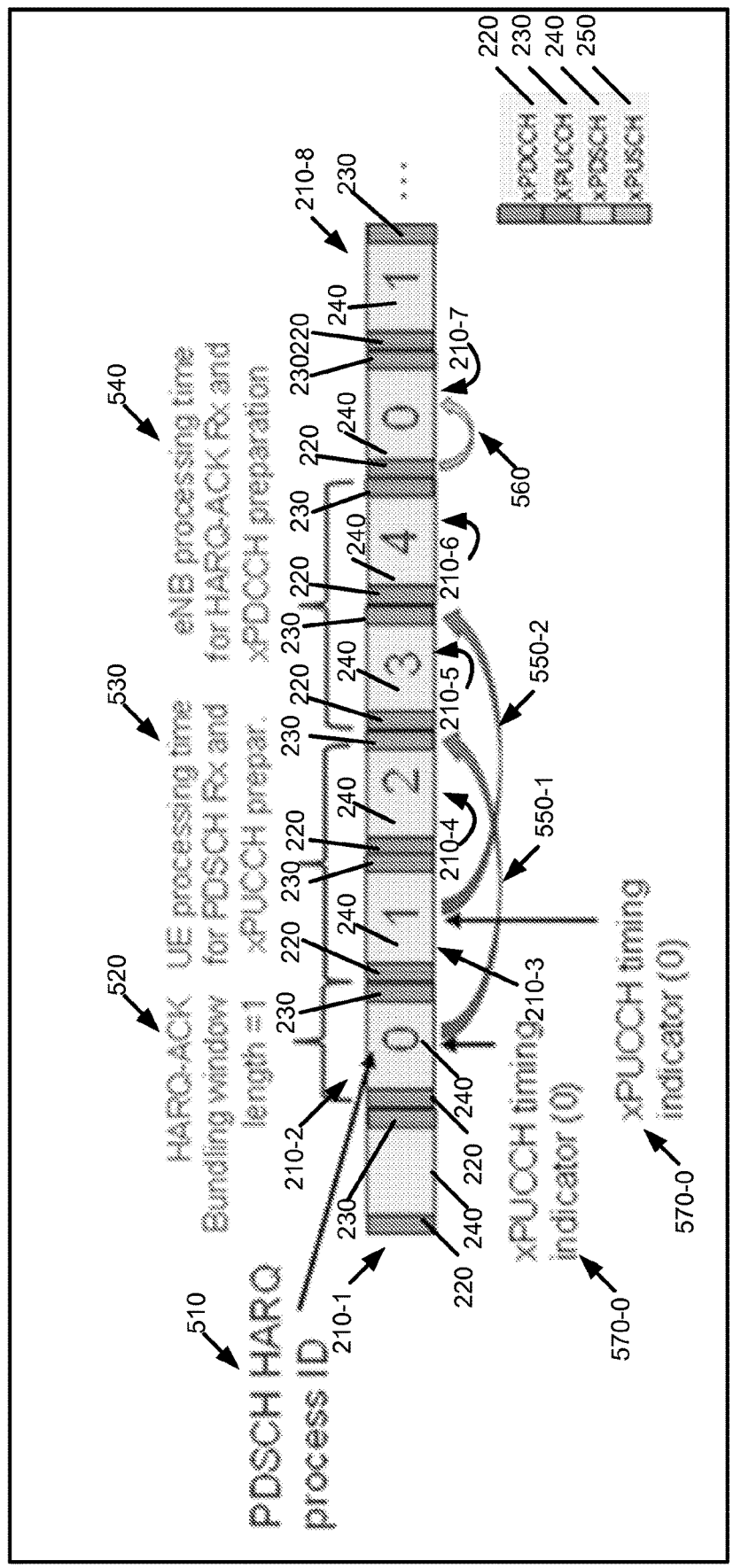
FIG. 6 illustrates latency optimized allocation (UE/eNB processing time is assumed to be about two subframes), where the larger arrows correspond to xPUCCH scheduling using xPDCCH and the smaller arrow corresponds to xPDSCH scheduling using xPDCCH.

Before proceeding with addition description of subframe allocation, an introduction is first provided for FIGS. 5 and 6. Although the subframe may support also transmission of xPUSCH (as indicated also in FIG. 2), we consider only a DL heavy scenario in these examples (as this is more important from an xPUCCH signaling point of view). FIG. 5 illustrates resource optimized allocation (UE/eNB processing time is assumed to be about two subframes). The larger arrows 550 correspond to xPUCCH scheduling using xPDCCH and the smaller arrow 560 corresponds to xPDSCH scheduling using xPDCCH. There are 11 subframes 210-1 through 210-11 shown. The PDSCH HARQ process ID 510 is also shown for most of the subframes 210. Each subframe 210 includes xPDCCH 220 and xPDSCH 240. Subframe 210-3 (also marked with PDSCH HARQ process ID 510 of 1), subframe 210-7 (also marked with PDSCH HARQ process ID 510 of 5), and subframe 210-11 (also marked with PDSCH HARQ process ID 510 of 1) contain xPUCCH 230. None of the subframes 210 is shown with xPUSCH 250. The HARQ-ACK bundling window length 520 is four. This corresponds to the number of DL subframes, which are mapped to the same xPUCCH subframe. It should be noted that subframes in certain bundling windows may not be consecutive in time (for example, there can be xPUSCH subframes in between). Another issue worth noting is that xPDSCH HARQ processes within a bundling window may not be consecutive ones as shown in FIG. 6, but the HARQ processes can be any HARQ processes between 0 and (K−1), where K is the number of HARQ processes supported and/or configured for the UE. The UE processing time for xPDSCH Rx and xPUCCH preparation (prepar.) 530 is illustrated as two subframes (210-6, 210-7 in this example), and the eNB processing time for HARQ-ACK Rx and xPDCCH/xPDSCH preparation 540 is shown as two subframes (210-8, 210-9 in this example). This figure also illustrates xPUCCH timing indicators (3) 570-3, (2) 570-2, (1) 570-1, and (0) 570-0.

FIG. 6 illustrates latency optimized allocation (UE/eNB processing time is assumed to be about two subframes). Most of the reference numbers have been described in reference to FIG. 5, so only the differences between the figures are described. In FIG. 6, only eight subframes 210-1 through 210-8 are shown. The HARQ-ACK bundling window length 520 is one in this example. The two larger arrows 550-1 and 550-2 correspond to xPUCCH scheduling using xPDCCH and the smaller arrow 560 corresponds to xPDSCH scheduling using xPDCCH. There are two xPUCCH timing indicators (0) 570-0, one for each subframe 210-2 and 210-3. The UE processing time for PDSCH Rx and xPUCCH preparation (prepar.) 530 is illustrated as two subframes (210-3, 210-4 in this example), and the eNB processing time for HARQ-ACK Rx and xPDCCH preparation 540 is shown as two subframes (210-5, 210-6 in this example). None of the subframes 210 is shown with xPUSCH 250.

Now that an introduction has been provided for FIGS. 5 and 6, in an exemplary embodiment, xPUCCH is triggered by the xPUCCH timing indicator bits 570 included in a DL grant (e.g., in xPDCCH) (see FIGS. 5 and 6). The DL grant is used for scheduling xPDSCH and transmitted in the same subframe as the timing indicator. Furthermore, as another alternative, the timing indicator may be transmitted in subframe different from a subframe containing a DL grant for xPDSCH. There can be, e.g., 2, 3 or 4×PUCCH timing indicator bits in each DL grant. The number of bits needed may depend on the (e.g., maximum) number of DL HARQ processes.

In another exemplary embodiment, the xPUCCH timing indicator 570 indicates the subframe offset between assigned xPDCCH and xPUCCH. Additionally, one value (e.g., highest code point) may indicate that the xPUCCH subframe has not yet been defined by eNB. Additional options are as follows.

Option #1: The offset does not include UE processing time. This has been assumed in the examples shown in FIG. 5 and FIG. 6. Subframe location of xPUCCH is obtained as the following: subframe number carrying xPDCCH/xPDSCH+offset defined by xPUCCH timing indicator 570 bits+UE processing time. For instance, in FIG. 5, assume the SFN is one (1) for subframe 210-2. The subframe location of the xPUCCH is therefore obtained for subframe 210-1 as the following: subframe number (1) carrying xPDCCH/xPDSCH+offsets (3) defined by xPUCCH timing indicator 570 bit+UE processing time (2)=1+3+2=6. The subframe with SFN=6 is subframe number 210-7, as illustrated in FIG. 5.

The UE processing time may be a common parameter for all UEs, or alternatively the processing time may be a UE capability/radio bearer/service-related parameter. In the latter case, initial access (e.g., including subsequent xPUCCH transmissions until RRC connection establishment) may be based on a predefined (e.g., conservative) value such as three or four subframes. FIGS. 5 and 6 assume that UE processing time is equal to two (about) subframes. Option #1 has a benefit of being transparent to different UE processing times from a signaling point of view (e.g., the number of bits reserved for indicator remains the same independent of UE capabilities).

Option #2: The offset defined by xPUCCH timing indicator 570 bits includes also UE processing time. Subframe location of xPUCCH is obtained as the following: subframe number carrying xPDCCH/xPDSCH+ offset defined by xPUCCH timing indicator bits.

These proposed exemplary techniques allow the eNB 170 to select a desired xPUCCH mode of operation dynamically and in a UE-specific manner (see more details in the example implementation section below). Subframe allocation for xPUCCH may be part of implicit xPUCCH resource allocation within a subframe (discussed below).

Example Implementation Overview: xPUCCH Resource Allocation within Subframe

An implicit resource allocation is proposed for xPUCCH resources in order to minimize xPDCCH resource consumption (e.g., as compared to explicit resource allocation).

An assumption is that xPDCCH and xPUCCH are defined according to (substantially) the same physical resource unit granularity and indexing scheme. The word "substantially" may also cover cases with xPUCCH resource unit (or alternatively xPDCCH) size being 2× or 3× (or in general N×) compared to that of xPDCCH (or xPUCCH, alternatively) (where "x" indicates size multiplication, such that 2× is twice as large, 3× is three times as large, and N× is N times as large).

A starting resource unit index of xPUCCH may be derived implicitly from a predetermined resource unit of the corresponding xPDCCH. Additional examples are as follows.

Figure 7:
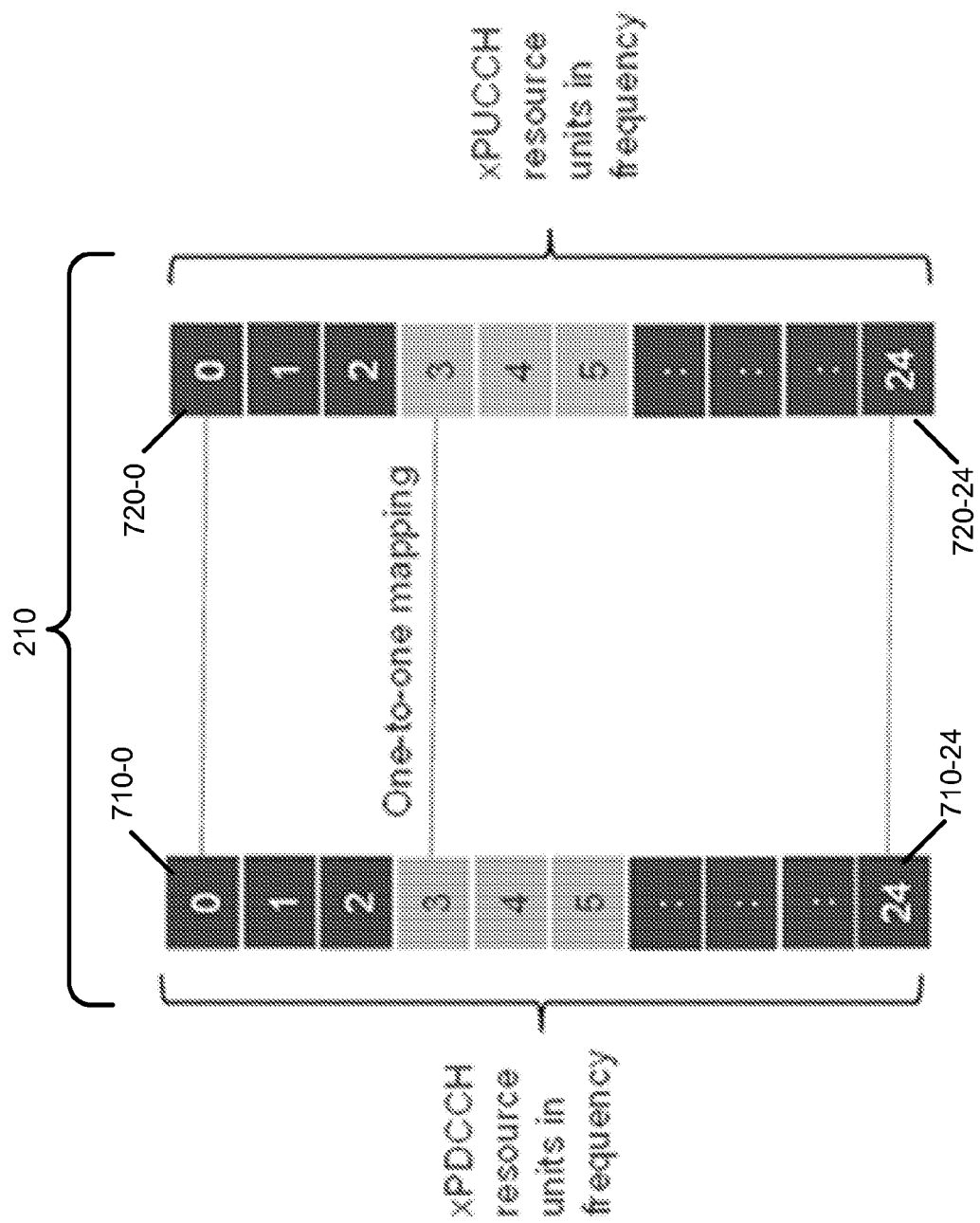
FIG. 7 illustrates a one to one mapping between an xPDCCH resource unit and an xPUCCH resource unit.

As one example, there may be a one-to-one mapping between a lowest resource unit of xPDCCH and a lowest resource unit of xPUCCH (see FIG. 7). In FIG. 7, each xPDCCH resource unit 710 (of which units 710-0 through 710-24 are shown) in a subframe 210 has a one-to-one mapping with a corresponding xPUCCH resource unit 720 (of which units 720-1 through 720-24 are shown). The resource units 710, 720 are in frequency. As described below, the eNB 170 may have different strategies. The eNB 170 may for example keep the xPDCCH allocation unchanged during the HARQ-ACK bundling window. Another strategy is to vary the allocation according to xPDCCH/xPUCCH loading situation between subframes.

As another example, in the case when xPUCCH covers HARQ-ACK for multiple subframes, resources in xPUCCH may be derived according to a predetermined subframe (e.g., the last subframe received in the HARQ-ACK bundling window, or the subframe with the smallest xPUCCH timing indicator value) and the corresponding lowest xPDCCH resource unit.

In a further example, xPUCCH/xPDCCH follows an indexing scheme, which results in localized allocation in the case when multiple physical resource units are allocated. Another option is to use an indexing scheme which results in distributed allocation. For instance, the eNB 170 may schedule xPDCCH (with different timing indicator values) and related xPDSCH separately. The xPDCCH resource elements may or may not change accordingly. The UE 110 will correspondingly derive xPUCCH resource(s) (if implicit resource allocation is used) based on the predetermined rule(s) related to xPDCCH scheduling the xPDSCH (e.g., the subframe of xPDSCH with lowest PUCCH timing indicator value would then indicate—via a rule—which xPUCCH resources would be used for at least the acknowledgement information from that subframe). In the case when the last xPDCCH is not detected correctly by the UE, the related xPUCCH resource may change accordingly. The eNB 170 may monitor multiple xPUCCH resources in parallel and is able to detect possible signaling error(s) related to xPDCCH detection.

In an additional example, localized allocation of xPDCCH/xPUCCH facilitates also FDPS (Frequency Domain Packet Scheduling) gain for both xPDCCH and xPUCCH. In other words, when an eNB 170 assigns xPDCCH in the "best" frequency domain resources based on the channel knowledge, xPUCCH will benefit from the FDPS gain accordingly. In particular, the idea is that both UL and DL have similar resource units in frequency. Another issue concerns a TDD system—the radio channel in such a system should be reciprocal. This means that a certain resource unit determined by the eNB as being good for a certain UE should be equally good for both DL (xPDCCH) and UL (xPUCCH), at least when ignoring the impact of interference (which is not reciprocal between UL and DL).

Resource size in terms of xPUCCH resource units may be signaled explicitly in the xPDCCH. This may cover, e.g., two or three bits.

As one option, resource size in terms of xPUCCH resource units may depend on aggregation level(s) used for xPDCCH, as illustrated by the following examples. Further, multiple xPUCCH resource units may be mapped to one or multiple xPUCCH symbols.

For instance, if the aggregation level for PDCCH is two or higher, an additional xPUCCH symbol is implicitly allocated for xPUCCH. Certain xPDCCH aggregation levels, e.g., four, may implicitly allocate a long xPUCCH format, which could take place on xPUSCH resources where frequency domain mapping may be derived as discussed above based on PDCCH resource elements. The term "long" may involve a scenario where xPUCCH resource units are mapped to multiple xPUCCH symbols (e.g., for the sake of improved coverage). Also, frequency domain mapping here reuses the above discussed methods on how to allocate frequency domain resources for xPUCCH derived from xPDCCH frequency domain resources. Here, an additional aspect is the xPDCCH aggregation level may be a dependent allocation in time. One another option is also to allocate resources in the frequency domain as a function of aggregation levels used for xPDCCH to decrease coding rate for xPUCCH and thus increase tolerance towards interference. Both options are possible: xPDCCH aggregation-level-dependent xPUCCH resource allocation may be performed in time and/or frequency.

As another example, in general, resource allocation for xPUCCH may be associated to xPDCCH aggregation levels (e.g., this feature may be configured on/off by the BS, e.g., via RRC level configuration). Certain aggregation level(s) for xPDCCH may also implicitly place an upper limit the xPUCCH payload size. In one example, if a UE 110 was to send a CSI report (e.g., for a large payload case), the large aggregation level used for xPDCCH may force the UE to drop, e.g., CSI from xPUCCH or alternatively allocate implicitly UE xPUSCH resources for the uplink control.

Example Implementations

The eNB 170 may select xPUCCH mode of operation dynamically and in a UE-specific manner by means of xPUCCH timing indicator bits as indicated by the following alternatives.

Alternative #1: This alternative involves resource optimized allocation. xPUCCH overhead/capacity can be optimized in the cell (e.g., at the expense of HARQ-ACK latency). See FIG. 5. Multiple DL subframes are mapped to a single xPUCCH subframe. A large number of DL HARQ processes are needed/consumed.

Alternative #2: This alternative involves latency optimized allocation. Latency performance can be optimized for certain UE(s). See FIG. 6. A small number of DL subframes (e.g., only one) are mapped to a single xPUCCH subframe. A smaller number of DL HARQ processes are needed/consumed relative to Alternative #1.

Thus, an eNB 170 might use two modes, one mode for Alternative #1 and another mode for Alternative #2, and switch between the two mode, e.g., by sending appropriate timing indicators in corresponding ones of the downlink subframes.

In the following, an example is provided for an xPUCCH resource allocation scheme.

The following may be xPUCCH resource allocation bits in a DL grant:
  2-3 bits, e.g., for xPUCCH timing indicator;
  2 bits, e.g., for xPUCCH resource size (if not implicitly derived from xPDSCH);
  Dynamic offset, e.g., 1-2 bits (optional); and
  4-6 bits, e.g., for xPUCCH starting resource unit (if not derived implicitly from xPDCCH starting resource).

The UE 110 determines the lowest resource unit of xPUCCH from the lowest resource unit of corresponding xPDCCH (see FIG. 7). There may be an additional offset available in a DL grant to modify the starting resource unit by the amount of the predetermined value, e.g., such that the starting position is started from the second to last xPUCCH symbol instead of the last one. Other possible offset values can be used as well. xPUCCH occupies the number of consecutive resource units defined by the DL grant.

xPUCCH utilizes a predefined transmission scheme. Below is an example of one realization.
  QPSK modulation;
  Joint coding between HARQ-ACK, CSI, SR (BSR), and variable number of input bits (based on the presence of CSI);
  Fixed HARQ-ACK payload based on the number of DL HARQ processes defined (=bitmap);
  Unused HARQ processes are mapped to "NACK";
  CSI bits according to CSI trigger included in DL grant;
  8-bit CRC is always included (for improving the robustness);
  The number of output bits defined by the coding scheme (For example, apply Tail-biting convolution code (1/3)); and
  Output bits are rate matched around the available xPUCCH resource elements (defined by the number of xPUCCH resource units).

Figure 8:
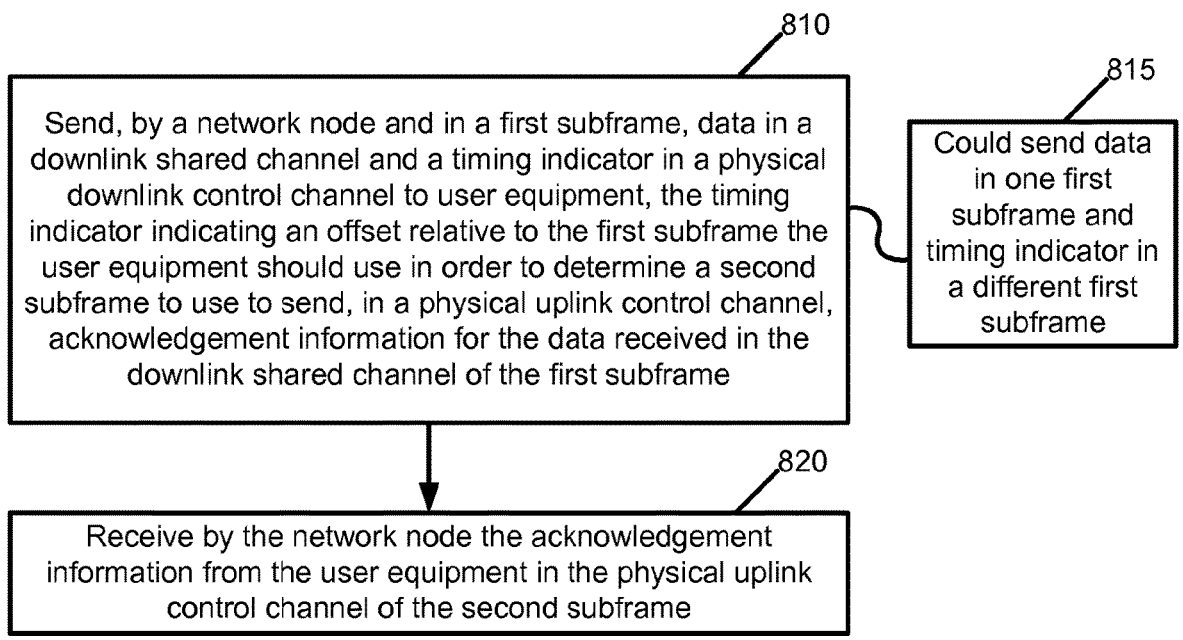
FIG. 8 is a logic flow diagram for PUCCH resource allocation performed by a network node, and illustrates the operation of an exemplary method, a result of execution of computer program instructions embodied on a computer readable memory, functions performed by logic implemented in hardware, and/or interconnected means for performing functions in accordance with exemplary embodiments.

Turning to FIG. 8, this figure illustrates a logic flow diagram for PUCCH resource allocation performed by a network node. This figure further illustrates the operation of an exemplary method, a result of execution of computer program instructions embodied on a computer readable memory, functions performed by logic implemented in hardware, and/or interconnected means for performing functions in accordance with exemplary embodiments. The blocks in FIG. 8 may be performed by a network node such as the RRH 195 or the eNB 170. For instance, the PUCCH RA module 150 may include multiples ones of the blocks in FIG. 8, where each included block is an interconnected means for performing the function in the block. The blocks in FIG. 8 are assumed to be performed by a network node, e.g., under control of the PUCCH RA module 150 at least in part.

In block 810, the network node sends, in a first subframe, data in a downlink shared channel and a timing indicator in a physical downlink control channel to user equipment. The timing indicator indicates an offset relative to the first subframe the user equipment should use in order to determine a second subframe to use to send, in a physical uplink control channel, acknowledgement information for the data received in the downlink shared channel of the first subframe. In block 820, the network node receives the acknowledgement information from the user equipment in the physical uplink control channel of the second subframe.

It is noted that primary emphasis here is placed on both the timing indicator and data being in the same (e.g., first) subframe. However, as indicated in block 815, the network node (e.g., eNB 170) could send the data in one first subframe and send the timing indicator in a different first subframe. In one example, delay from xPDCCH (DL grant) to xPDSCH would be defined to be same as for delay from xPDCCH (UL grant) to xPUSCH (uplink data) which is typically one or more subframes. However, it is possible to allow that xPDSCH may not be in the same subframe as xPDCCH (DL grant and xPUCCH resource allocation, e.g., the timing indicator) in some cases.

It is further noted that the term "user equipment" may mean a single UE 110 or multiple UEs 110. For instance, the method of FIG. 8 may be applied to a single UE 110 or multiple UEs 110. The techniques in FIG. 5 and/or FIG. 6 may be applied to a single UE 110 or to multiple UEs 110, e.g., depending on situation and implementation.

The following are additional examples. In these examples, the method in FIG. 8 is referred to as example 1.

Example 2

The method of example 1, wherein the timing indicator does not include processing time for the user equipment.

Example 3

The method of example 1, wherein the timing indicator does include processing time for the user equipment.

Example 4

The method of any one of examples 1 to 3, wherein:
the sending is performed for multiple first subframes and corresponding timing indicators are modified for the multiple first subframes so that the user equipment would calculate a same second subframe to use for acknowledgement information for the data received by the user equipment in the multiple first subframes; and
receiving further comprises receiving by the network node the acknowledgement information from the user equipment in the physical uplink control channel of the second subframe for the acknowledgement information for the data received by the user equipment in the multiple first subframes.

Example 5

The method of any one of examples 1 to 4, wherein:
receiving further comprises receiving by the network node the acknowledgement information from the user equipment based on a starting resource unit index of the physical uplink control channel of the second subframe, and wherein the starting resource unit index of the physical uplink control channel of the second subframe is derived implicitly from a predetermined resource unit of the corresponding physical downlink control channel.

Example 6

The method of any one of examples 1 to 4, wherein:
receiving further comprises receiving by the network node the acknowledgement information from the user equipment in resources of the physical uplink control channel of the second subframe, and wherein locations of the resources in the physical uplink control channel of the second subframe are derived according to a predetermined subframe and a corresponding lowest physical downlink control channel resource unit.

Example 7

The method of example 6, wherein the predetermined subframe is one of a last subframe received by the user equipment in a HARQ-ACK bundling window, or a subframe with a smallest value of the timing indicator.

Example 8

The method of any one of examples 1 to 7, further comprising the network node signaling resource size in terms of resource units of the physical uplink control channel, and wherein receiving further comprises receiving by the network node the acknowledgement information from the user equipment in the physical uplink control channel of the second subframe and based on the resource size in terms of the resource units of the physical uplink control channel.

Example 9

The method of any one of examples 1 to 8, wherein:
each of the first subframes comprises a physical downlink control channel; and
the acknowledgement information from the user equipment in the physical uplink control channel of the second subframe uses a resource size in terms of resource units in the physical uplink control channel, and the resource size depends on one or more aggregation levels used for the physical downlink control channel.

Example 10

The method of example 9, wherein in response to the aggregation level for the physical downlink control channel being two or higher, an additional physical uplink control channel symbol and/or additional resource elements is/are implicitly allocated for the physical uplink control channel.

Example 11

The method of example 9, wherein resource allocation for the physical uplink control channel is associated to physical downlink control channel aggregation levels.

Example 12

The method of example 11, wherein certain of one or more aggregation levels for the physical downlink control channel also implicitly places an upper limit on payload size for the physical uplink control channel.

Example 13

The method of any one of examples 1 to 12, wherein allocation of resource units for use for the acknowledgement information of the physical uplink control channel is implicit, and wherein the implicit allocation resource units of the physical uplink control channel is based on substantially a same resource unit granularity and indexing scheme applied for both the physical downlink control channel and the physical uplink control channel.

Example 14

The method of example 13, wherein the implicit allocation is based on one or more predetermined rules related to scheduling on the physical downlink control channel of the physical downlink shared channel.

Additional examples with respect to example 1 are as follows. Any of the methods of the exemplary examples above (e.g., examples 1-14), wherein the timing indicator indicates the offset relative to the first subframe is dependent on at least one of the following properties: capability of the user equipment, radio bearer, and service. A method of this paragraph, wherein until a higher layer configuration for timing has been established, the timing indicator indicating the offset relative to the first subframe is based on a common parameter comprising one of three or four subframes.

Any of the exemplary methods above, wherein the network node varies subframe type between downlink subframe, uplink subframe, and bi-directional subframe in a dynamic manner. Any of the exemplary methods above, wherein a number of orthogonal frequency division multiplexing symbols carrying the physical uplink control channel varies dynamically from subframe to subframe. Any of the exemplary methods above, further comprising the network node signaling resource size in terms of resource units of the physical uplink control channel, and wherein receiving further comprises receiving by the network node the acknowledgement information from the user equipment in the physical uplink control channel of the second subframe and based on the resource size in terms of the resource units of the physical uplink control channel.

Figure 9:
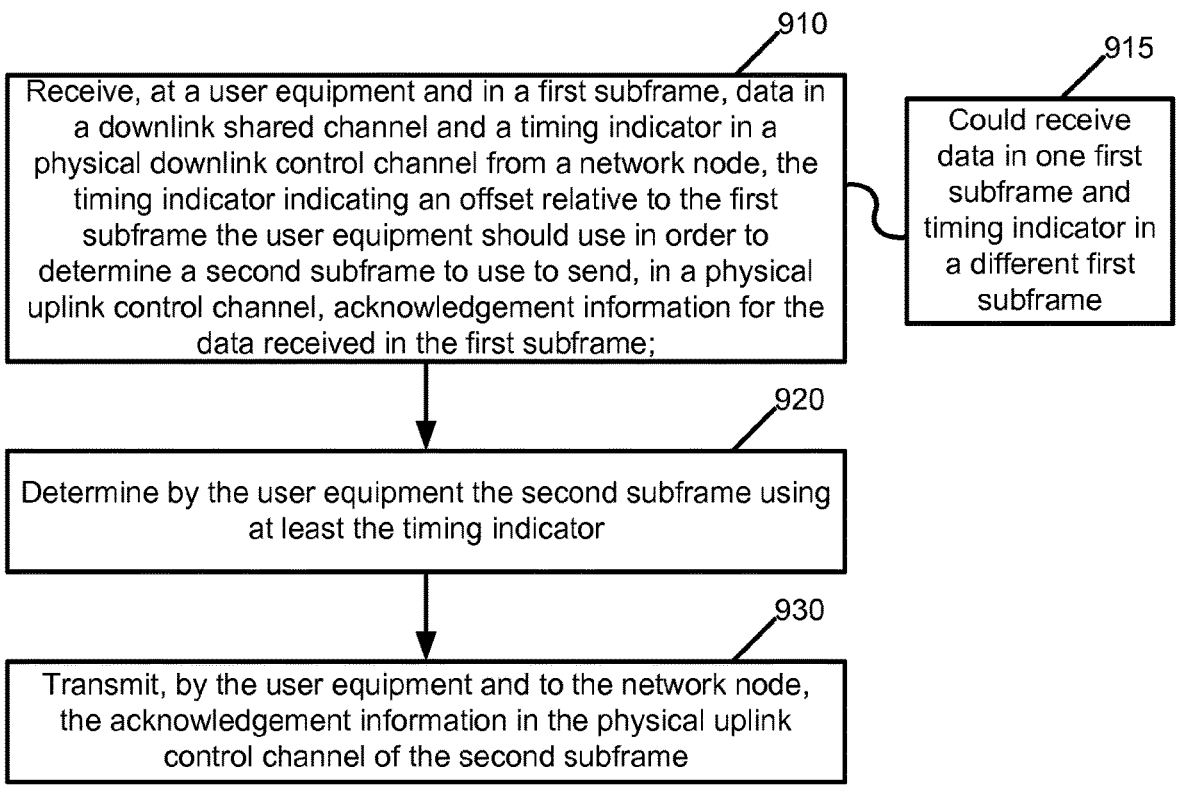
FIG. 9 is a logic flow diagram for PUCCH resource allocation performed by a user equipment, and illustrates the operation of an exemplary method, a result of execution of computer program instructions embodied on a computer readable memory, functions performed by logic implemented in hardware, and/or interconnected means for performing functions in accordance with exemplary embodiments.

Referring to FIG. 9, this is a logic flow diagram for PUCCH resource allocation performed by a user equipment. This figure further illustrates the operation of an exemplary method, a result of execution of computer program instructions embodied on a computer readable memory, functions performed by logic implemented in hardware, and/or interconnected means for performing functions in accordance with exemplary embodiments. For instance, the PUCCH RA module 140 may include multiples ones of the blocks in FIG. 9, where each included block is an interconnected means for performing the function in the block. The blocks in FIG. 9 are assumed to be performed by a UE 110, e.g., under control of the PUCCH RA module 140 at least in part.

In block 910, the UE 110 receives, in a first subframe, data in a downlink shared channel and a timing indicator in a physical downlink control channel from a network node. The timing indicator indicates an offset relative to the first subframe the user equipment should use in order to determine a second subframe to use to send, in a physical uplink control channel, acknowledgement information for the data received in the first subframe. In block 920, the UE 110 determines the second subframe using at least the timing indicator. In block 930, the UE 110 transmits, to the network node, the acknowledgement information in the physical uplink control channel of the second subframe.

As with FIG. 8, in FIG. 9 the primary emphasis here placed on both the timing indicator and data being in the same (e.g., first) subframe. However, as indicated in block 915, the UE 110 could receive the data in one first subframe and also receive the timing indicator in a different first subframe. As described above, delay from xPDCCH (DL grant) to xPDSCH would be defined to be same as for delay from xPDCCH (UL grant) to xPUSCH (uplink data) which is typically one or more subframes. However, it is possible to allow that xPDSCH may not be in the same subframe as xPDCCH (DL grant and xPUCCH resource allocation, e.g., the timing indicator) in some cases.

Additional examples are now presented. In these examples, FIG. 9 is referred to as example 15.

Example 16

The method of example 15, wherein:
the timing indicator does not include processing time for the user equipment;
the determining comprises computing a subframe number for the second subframe by using the following equation: a subframe number for the first subframe+offset defined by a value corresponding to the timing indicator+the processing time for the user equipment; and
the transmitting comprises transmitting the acknowledgement information in the physical uplink control channel of a subframe having the subframe number for the second subframe that is determined using the equation.

Example 17

The method of example 15, wherein:
the timing indicator includes processing time for the user equipment;
the determining comprises computing a subframe number for the second subframe by using the following equation: a subframe number for the first subframe+offset defined by a value corresponding to the timing indicator; and
the transmitting comprises transmitting the acknowledgement information in the physical uplink control channel of a subframe having the subframe number for the second subframe that is determined using the equation.

Example 18

The method of any one of examples 15 to 17, wherein:
the receiving is performed for multiple first subframes and corresponding timing indicators are modified for the multiple first subframes;
determining further comprises calculating based on the corresponding timing indicators a same second subframe to use for acknowledgement information for the data received by the user equipment in the multiple first subframes, wherein the corresponding timing indicators were modified so that the calculating results in the same second subframe; and
transmitting further comprises transmitting by the user equipment the acknowledgement information, for the data received by the user equipment in the multiple first subframes, in the physical uplink control channel of the same second subframe.

Example 19

The method of any one of examples 15 to 18, wherein:
determining further comprises implicitly deriving a starting resource unit index of physical uplink control channel of the second subframe from a predetermined resource unit of the corresponding physical downlink control channel; and
transmitting further comprises transmitting the acknowledgement information on one or more resource units in the physical uplink control channel of the second subframe based on the starting resource unit index of the physical uplink control channel of the second subframe.

Example 20

The method of any one of examples 15 to 18, wherein:
determining further comprises deriving locations of resources to be used for sending acknowledgement information in the physical uplink control channel of the second subframe according to a predetermined subframe and a corresponding lowest physical downlink control channel resource unit; and
transmitting further comprises transmitting the acknowledgement information from the user equipment in the derived locations of the resources of the physical uplink control channel of the second subframe.

Example 21

The method of example 20, wherein the predetermined subframe is one of a last subframe received by the user equipment in a HARQ-ACK bundling window, or a subframe with a smallest value of the timing indicator.

Example 22

The method of any one of examples 15 to 21, further comprising receiving, by the user equipment and from the network node, signaling resource size in terms of resource units of the physical uplink control channel, and wherein transmitting further comprises transmitting the acknowledgement information from the user equipment in the physical uplink control channel of the second subframe and based on the resource size in terms of the resource units of the physical uplink control channel.

Example 23

The method of any one of examples 15 to 22, wherein:
each of the first subframes comprises a physical downlink control channel; and
transmitting further comprises transmitting the acknowledgement information from the user equipment in the physical uplink control channel of the second subframe using a resource size in terms of resource units in the physical uplink control channel, and the resource size depends on one or more aggregation levels used for the physical downlink control channel.

Example 24

The method of example 23, wherein in response to the aggregation level for the physical downlink control channel being two or higher, an additional physical uplink control channel symbol and/or additional resource elements is/are implicitly allocated for the physical uplink control channel.

Example 25

The method of example 23, wherein resource allocation for the physical uplink control channel is associated to physical downlink control channel aggregation levels.

Example 26

The method of example 25, wherein certain of one or more aggregation levels for the physical downlink control channel also implicitly places an upper limit on payload size for the physical uplink control channel.

Example 27

The method of any one of examples 15 to 26, wherein allocation of resource units for use for the acknowledgement information of the physical uplink control channel is implicit, and wherein the implicit allocation resource units of the physical uplink control channel is based on substantially a same resource unit granularity and indexing scheme applied for both the physical downlink control channel and the physical uplink control channel.

Further examples are as follows. A method as above (e.g., examples 15-27), wherein the timing indicator indicates the offset relative to the first subframe is dependent on at least one of the following properties: capability of the user equipment, radio bearer, and service. The method of this paragraph, wherein until a higher layer configuration for timing has been established, the timing indicator indicating the offset relative to the first subframe is based on a common parameter comprising one of three or four subframes.

A method as in the exemplary methods above, wherein subframe type varies between downlink subframe, uplink subframe, and bi-directional subframe in a dynamic manner. A method as in the exemplary methods above, wherein a number of orthogonal frequency division multiplexing symbols carrying the physical uplink control channel varies dynamically from subframe to subframe. A method as in the exemplary methods above, further comprising receiving, by the user equipment and from the network node, resource size in terms of resource units of the physical uplink control channel, and wherein transmitting further comprises transmitting the acknowledgement information from the user equipment in the physical uplink control channel of the second subframe and based on the resource size in terms of the resource units of the physical uplink control channel.

Example 28

A computer program, comprising code for performing the method of any one of examples 1 to 27, when the computer program is run on a processor.

Example 29

The computer program according to example 28, wherein the computer program is a computer program product comprising a computer-readable medium bearing computer program code embodied therein for use with a computer.

Example 30

An apparatus, comprising:
at least one processor; and
at least one memory including computer program code, the at least one memory and the computer program code configured, with the at least one processor, to cause the apparatus to perform the method of any one of examples 1 to 14.

Example 31

An apparatus, comprising:
at least one processor; and
at least one memory including computer program code, the at least one memory and the computer program code configured, with the at least one processor, to cause the apparatus to perform the method of any one of examples 15 to 27.

Example 32

An apparatus, comprising:
means for sending, by a network node and in a first subframe, data in a downlink shared channel and a timing indicator in a physical downlink control channel to a user equipment, the timing indicator indicating an offset relative to the first subframe the user equipment should use in order to determine a second subframe to use to send, in a physical uplink control channel, acknowledgement information for the data received in the downlink shared channel of the first subframe; and
means for receiving by the network node the acknowledgement information from the user equipment in the physical uplink control channel of the second subframe.

Example 33

The apparatus of example 32, further comprising means for performing the method of any one of examples 2 to 14.

Example 34

An apparatus, comprising:
means for receiving, at a user equipment and in a first subframe, data in a downlink shared channel and a timing indicator in a physical downlink control channel from a network node, the timing indicator indicating an offset relative to the first subframe the user equipment should use in order to determine a second subframe to use to send, in a physical uplink control channel, acknowledgement information for the data received in the first subframe; means for determining by the user equipment the second subframe using at least the timing indicator; and
means for transmitting, by the user equipment and to the network node, the acknowledgement information in the physical uplink control channel of the second subframe.

Example 35

The apparatus of example 34, further comprising means for performing the method of any one of examples 16 to 27.

Example 36

A system comprising any of the apparatus of examples 32 or 33 and any of the apparatus of examples 34 or 35.

Example 37

A base station comprising any of the apparatus of examples 32 or 33.

Example 38

A user equipment comprising any of the apparatus of examples 34 or 35.

Without in any way limiting the scope, interpretation, or application of the claims appearing below, a technical effect and advantage of one or more of the example embodiments disclosed herein is efficient support for PDSCH-HARQ ACK feedback signaling for hybrid architectures short of beam and hardware resources. Another technical effect and advantage of one or more of the example embodiments disclosed herein is implementations provide opportunities for the eNB to trade-off latency and xPUCCH overhead based on various requirements (e.g., latency, UE category, and the like). Another technical effect and advantage of one or more of the example embodiments disclosed herein is the proposed techniques minimize the need for explicit resource allocation signaling. Another technical effect and advantage of one or more of the example embodiments disclosed herein is the proposed techniques can be utilized also in digital architecture and thus can be seen as a transceiver-agnostic xPUCCH design which is seen as vital property of 5G specifications to enable 5G systems to operate across different carrier frequencies from 3 GHz all the way up to 70 GHz.

Embodiments herein may be implemented in software (executed by one or more processors), hardware (e.g., an application specific integrated circuit), or a combination of software and hardware. In an example embodiment, the software (e.g., application logic, an instruction set) is maintained on any one of various conventional computer-readable media. In the context of this document, a "computer-readable medium" may be any media or means that can contain, store, communicate, propagate or transport the instructions for use by or in connection with an instruction execution system, apparatus, or device, such as a computer, with one example of a computer described and depicted, e.g., in FIG. 1. A computer-readable medium may comprise a computer-readable storage medium (e.g., memories 125, 155, 171 or other device) that may be any media or means that can contain, store, and/or transport the instructions for use by or in connection with an instruction execution system, apparatus, or device, such as a computer. A computer-readable storage medium does not comprise propagating signals.

If desired, the different functions discussed herein may be performed in a different order and/or concurrently with each other. Furthermore, if desired, one or more of the above-described functions may be optional or may be combined.

Although various aspects of the invention are set out in the independent claims, other aspects of the invention comprise other combinations of features from the described embodiments and/or the dependent claims with the features of the independent claims, and not solely the combinations explicitly set out in the claims.

It is also noted herein that while the above describes example embodiments of the invention, these descriptions should not be viewed in a limiting sense. Rather, there are several variations and modifications which may be made without departing from the scope of the present invention as defined in the appended claims.

The following abbreviations that may be found in the specification and/or the drawing figures are defined as follows:
4G fourth generation
5G fifth generation
ACK acknowledgement
BS base station
BSR Buffer Status Report
cmWave centimeter wave
CSI channel state information
DL downlink (from network to user equipment)
eNB (or eNodeB) evolved Node B (e.g., an LTE base station)
FDPS frequency domain packet scheduling
Gb/s gigabytes per second
HARQ hybrid automatic repeat request
ID identification
I/F interface
KPI key performance indicator
LBT listen before talk
LTE long term evolution
MIMO multiple input, multiple output
MME mobility management entity
mmWave millimeter wave
ms milliseconds
NCE network control element
N/W network
OFDM orthogonal frequency division multiplexing
PDCCH physical downlink control channel
PDSCH physical downlink shared channel
PUCCH physical uplink control channel
PUSCH physical uplink shared channel
RA resource allocation
RE resource element
RF radio frequency
RRC radio resource control
RRH remote radio head
Rx or RX receiver or reception
SFN subframe number
SGW serving gateway
sPUCCH short PUCCH
SR scheduling request
TDD time division duplexing
TS technical standard
Tx or TX transmitter or transmission
UCI uplink control information
UE user equipment (e.g., a wireless, typically mobile device)
UL uplink (from user equipment to network)
xPDCCH physical downlink control channel for 5G and beyond
xPDSCH physical downlink shared channel for 5G and beyond
xPUCCH physical uplink control channel for 5G and beyond
xPUSCH physical uplink shared channel for 5G and beyond
X-pol cross-polarized

The invention claimed is:
1. An apparatus, comprising:
at least one processor; and
at least one memory including computer program code, the at least one memory and the computer program code configured, with the at least one processor, to cause the apparatus to:
send in a first subframe, data in a downlink shared channel and a timing indicator in a physical downlink control channel to user equipment, the timing indicator indicating an offset relative to the first subframe the user equipment should use in order to determine a second subframe to use to send, in a physical uplink control channel, acknowledgement information for the data received in the downlink shared channel of the first subframe; and receive the acknowledgement information from the user equipment in the physical uplink control channel of the second subframe, wherein the physical uplink control channel is allocated a number of orthogonal frequency division multiplexing symbols, and the number is dynamically variable from uplink subframe to uplink subframe.

2. The apparatus of claim 1, wherein the timing indicator does encompasses processing time for the user equipment.

3. The apparatus of claim 1, wherein:
the sending is performed for multiple first subframes and corresponding timing indicators are modified for the multiple first subframes so that the user equipment would calculate a same second subframe to use for acknowledgement information for the data received by the user equipment in the multiple first subframes; and
the receiving further comprises receiving the acknowledgement information from the user equipment in the physical uplink control channel of the second subframe for the acknowledgement information for the data received by the user equipment in the multiple first subframes.

4. The apparatus of claim 1, wherein the timing indicator indicates the offset relative to the first subframe is dependent on at least capability of the user equipment.

5. The apparatus of claim 1, wherein until a higher layer configuration for timing has been established, the timing indicator indicating the offset relative to the first subframe is based on a common parameter comprising one of three or four subframes.

6. The apparatus of claim 1, wherein subframe type between downlink subframe, uplink subframe, and bi-directional subframe varies in a dynamic manner.

7. The apparatus of claim 1, wherein the at least one memory and the computer program code are further configured to, with the at least one processor, cause the apparatus to: signal resource size in terms of resource units of the physical uplink control channel, and wherein the receiving further comprises receiving the acknowledgement information from the user equipment in the physical uplink control channel of the second subframe and based on the resource size in terms of the resource units of the physical uplink control channel.

8. An apparatus, comprising:
at least one processor; and
at least one memory including computer program code, the at least one memory and the computer program code configured, with the at least one processor, to cause the apparatus to:
receive in a first subframe, data in a downlink shared channel and a timing indicator in a physical downlink control channel from a network node, the timing indicator indicating an offset relative to the first subframe the apparatus should use in order to determine a second subframe to use to send, in a physical uplink control channel, acknowledgement information for the data received in the first subframe;
determine the second subframe using at least the timing indicator; and
transmit to the network node, the acknowledgement information in the physical uplink control channel of the second subframe,
wherein the physical uplink control channel is allocated a number of orthogonal frequency division multiplexing symbols, and the number is dynamically variable from uplink subframe to uplink subframe.

9. The apparatus of claim 8, wherein:
the timing indicator encompasses processing time for the apparatus;
the determining comprises computing a subframe number for the second subframe by using a summation of a subframe number for the first subframe and the offset defined by a value corresponding to the timing indicator; and
the transmitting comprises transmitting the acknowledgement information in the physical uplink control channel of a subframe having the subframe number for the second subframe that is determined using the summation.

10. The apparatus of claim 8, wherein:
the receiving is performed for multiple first subframes and corresponding timing indicators are modified for the multiple first subframes;
the determining further comprises calculating based on the corresponding timing indicators a same second subframe to use for acknowledgement information for the data received in the multiple first subframes, wherein the corresponding timing indicators were modified so that the calculating results in the same second subframe; and
the transmitting further comprises transmitting the acknowledgement information, for the data received in the multiple first subframes, in the physical uplink control channel of the same second subframe.

11. The apparatus of claim 8, wherein the timing indicator indicates the offset relative to the first subframe is dependent on at least capability of the apparatus.

12. The apparatus of claim 8, wherein until a higher layer configuration for timing has been established, the timing indicator indicating the offset relative to the first subframe is based on a common parameter comprising one of three or four subframes.

13. The apparatus of claim 8, wherein subframe type varies between downlink subframe, uplink subframe, and bi-directional subframe in a dynamic manner.

14. The apparatus of claim 8, wherein the at least one memory and the computer program code are further configured to, with the at least one processor, cause the apparatus to: receive and from the network node, resource size in terms of resource units of the physical uplink control channel, and wherein the transmitting further comprises transmitting the acknowledgement information in the physical uplink control channel of the second subframe and based on the resource size in terms of the resource units of the physical uplink control channel.

15. A method, comprising:
receiving, at a user equipment in a first subframe, data in a downlink shared channel and a timing indicator in a physical downlink control channel from a network node, the timing indicator indicating an offset relative to the first subframe the user equipment should use in order to determine a second subframe to use to send, in a physical uplink control channel, acknowledgement information for the data received in the first subframe;
determining by the user equipment the second subframe using at least the timing indicator; and
transmitting, by the user equipment and to the network node, the acknowledgement information in the physical uplink control channel of the second subframe,
wherein the physical uplink control channel is allocated a number of orthogonal frequency division multiplexing symbols, and the number is dynamically variable from uplink subframe to uplink subframe.

16. The method of claim 15, wherein:

the receiving is performed for multiple first subframes and corresponding timing indicators are modified for the multiple first subframes;

the determining further comprises calculating based on the corresponding timing indicators a same second subframe to use for acknowledgement information for the data received by the user equipment in the multiple first subframes, wherein the corresponding timing indicators were modified so that the calculating results in the same second subframe; and the transmitting further comprises transmitting by the user equipment the acknowledgement information, for the data received by the user equipment in the multiple first subframes, in the physical uplink control channel of the same second subframe.

17. The method of claim 15, wherein the timing indicator indicates the offset relative to the first subframe is dependent on at least capability of the user equipment.

18. The method of claim 15, wherein subframe type varies between downlink subframe, uplink subframe, and bi-directional subframe in a dynamic manner.

* * * * *